Patented July 14, 1931

1,814,190

UNITED STATES PATENT OFFICE

ROBERT L. SEBASTIAN AND LEO FINKELSTEIN, OF EDGEWOOD, MARYLAND, ASSIGNORS TO HARRY A. KUHN, OF EDGEWOOD ARSENAL, MARYLAND

MULTILAYER FILTER

No Drawing.     Application filed October 28, 1926. Serial No. 145,695.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty thereon.

This invention relates in general to filters and more particularly has reference to filters composed of a plurality of layers commonly used in gas masks.

Heretofore in the art among the various methods for removing smoke, gas or other foreign substance from the air numerous types of filters have been utilized. A number of fabrics and other materials have been tested for filtration qualities both in a single layer or in a plurality of layers. In practically every instance the resistance of the filters previously used has become abnormally high, when a high filter efficiency was obtained.

An object of this invention is to provide a treatment for multi-layer filters designed to greatly increase the filtering efficiency without appreciably raising the resistance.

A further object of this invention is to provide an improvement for multi-layer filters that will greatly increase the filtering efficiency and decrease the normal resistance.

With these and other objects in view which may be incident to the treatment of filters embodied herein, the invention consists in the process to be hereinafter set forth and claimed, with the understanding that the several necessary steps comprising the invention may be varied in their order or suitable ingredients substituted in place of those designated without departing from the spirit and scope of the appended claims.

In order to make the invention more clearly understood there is decribed hereinafter means for carrying the same into practical effect, without limiting the treatments in their useful applications to particular ingredients, which for the purpose of explanation have been made the subject of illustration.

This invention consists in general of the impregnation of each section of a multilayer foraminous filter with solid particles to eliminate the smaller pores, and thereby partially equalize the remainder, the impregnation to be uniform in all layers or to vary one layer from another. In some instances it is desirable to have a relatively high impregnation on the outer layer of the filter and a progressively decreasing impregnation on the inner adjacent layers. It further consists of the provision of a method for further equalizing the diameter of the pores of all the sections by increasing the number of layers to prevent the large pores coinciding and thereby eliminating the large pores without raising the resistance to any considerable extent.

The theory of filtration from which the subject matter forming this invention is derived may well be understood. When a gaseous stream containing smoke or other particles of material comes in contact with a filter surface it is diverted into a number of small currents, each of which are deflected on contact and travel parallel to the surface of the filter before reaching a pore opening. The particles traversing in a parallel plane over the surface are gradually deposited thereon. There is a definite probability that each particle will be deposited after traversing a certain distance. That is, the time element enters and the longer the duration of contact of the particles with the surface of the filter, the greater the probability that the particles will be deposited on the same. It follows that two ways exist for a filter to be improved, either by increasing the length of the travel of the particle on the surface, or by increasing the time the particle takes in traveling over a given distance on the surface. The length of the path may be increased by decreasing the number of pores or increasing the distance between the pore openings.

The time the particle takes to travel over a given path on the surface may be increased by raising the resistance of the filter. Since an increase in the resistance would retard the normal operation of the filter, the increase of the length of the path of the particle over the surface is therefore the logical improvement.

As the rate of flow through a capillary tube is proportional to the fourth power of its diameter, the small pores may be eliminated without increasing the resistance to any great degree and a great gain in filtering efficiency will result.

These small pores may be eliminated by impregnating each filter layer. This is in effect a plugging action not due to the clogging of a pore by a single large particle but to the deposition and formation of a flocculent aggregate at the mouth of the pore, so that the diameter is constricted and the air ceases to pass through that particular pore. Any solid impregnating smoke or pulverized solid material may be used to accomplish this step. It is evident that by passing smoke or other substance through the filter the smaller pores will be closed. This diminishes the number of functioning pores and causes an increase of the length of the path necessary for the particle to travel.

It is apparent that the natural impregnation occurring in a filter during operation would not accomplish this result, in that the outer layer only would be so clogged or plugged, and while the peak of efficiency is reached for a short time, there is a corresponding rapid increase of resistance that retards the action.

It is manifest that since the resistance of the filter is proportional to the fourth power of the diameter of the pore, to accomplish a low resistance it is necessary to provide pores of as large a diameter as possible without decreasing the efficiency. If the pores be of too great a diameter the filter will necessarily function improperly allowing substances to pass entirely through, thereby lowering its efficiency. It follows that by the provision of pores of a critical diameter, a filter may be increased in efficiency without raising the resistance much. By critical diameter is meant a pore having the largest diameter possible without decreasing the efficiency of the filter, or raising the resistance. Thus if the pore diameter be decreased to a point below the critical diameter, the resistance will increase very rapidly with no gain in efficiency. Conversely by having pores of too great a diameter, while the resistance will be decreased the efficiency will be lowered in proportion.

The critical pore size may be obtained by either of two methods, first by increasing the thickness of the filters and necessarily increasing the resistance faster than the gain in efficiency, or second by eliminating unnecessary pores, namely those very small and those very large. The larger pores may be disposed of by increasing the layers of the filter, for in a random distribution of pores having various size openings, laying one layer on another allows only a small degree of probability of the larger pores of the different layers coinciding. It will be appreciated that the larger the pore diameter, the smaller is this probability. A minimum thickness therefore can be reached when the pores are as large as or smaller than the critical pore diameter. The smaller pores may be eliminated by the impregnation of the several layers with smoke or other substance adapted to clog or plug them so that the diameter is constricted and the smoke or gas ceases to pass. As the greatest efficiency of the filter exists when the critical pore size is obtained, it is necessary to determine that diameter. This may be accomplishel by impregnating a single layer of filtering material until a certain arbitrary degree of resistance is reached. A second filter is prepared composed of two layers and impregnated until a certain arbitrary degree of resistance is reached. A second filter is prepared composed of two layers and impregnated until the combined resistance of the two is equal to the arbitrary resistance taken as a standard; in this manner filters composed of layers varying in proportion are prepared. The conclusion of the series is reached when the number of untreated layers required to give the standard resistance is obtained.

Each of the filter units are then tested against the material to which they are adapted to be subjected where it will necessarily follow that the single layer being of high penetration will be of low filter efficiency due to the presence of large pores. As the number of layers is increased the filtering efficiency will mount rapidly until a certain number of layers is reached, namely, until the large and small pores are eliminated and the filter in this stage possesses the maximum number of pore openings of the critical size. As the number of layers is further increased the efficiency will necessarily be lowered due to the decreasing impregnation and corresponding increase of small pores. The filter having pores of the critical diameter and therefore of the greatest efficiency will be that one of the series allowing the minimum of penetration.

It is manifest that the various layers may be impregnated unequally, the outer layers usually possessing the greatest impregnation although this is arbitrary with the need.

Filtering material of any substance desired may be used provided it is of proper texture for the process. The matter used for impregnation may be any substance found most suitable. It has been found that camphor black obtained by burning camphor, or acetylene black by burning acetylene, or zinc oxide obtained from the decomposition of zinc ethyl are satisfactory substances. It is understood that this invention is not limited to any particular material as an impregnant and that further the method of impregnation may be accomplished by the use of finely pulverized substances blown on the filter, drawn in by suction and and deposited or by any other of numerous conventional methods.

The construction of the filter may be varied to suit the need. Long strips may be impregnated and wrapped to a sufficient number of layers around a screen or any desired object, or may be as preferable, cut to the proper size and each layer impregnated with equal or unequal amounts of impregnating material, and then built up in layers until the critical pore diameter is obtained.

While there is shown and described the preferred embodiment of this invention, it is to be understood that it is not confined to the precise details or treatment herein set forth, by way of illustration, as it is apparent that many changes and variations may be made therein, by those skilled in the art, without departing from the spirit of the invention, or exceeding the scope of the appended claims.

We claim:

1. A process for building a filter comprising the steps of separately impregnating each of a plurality of layers of filtering material with finely divided solid particles adapted to fill up certain pores of said material and superimposing the layers of said material upon each other so as to obtain a critical pore diameter.

2. A process for building a filter comprising the steps of separately impregnating each of a plurality of layers of filtering material with unequal amounts of finely divided particles adapted to fill up certain pores of said material and superimposing the layers of said material upon each other so as to obtain a critical pore diameter.

3. A process for building a filter comprising the steps of separately impregnating each of a plurality of layers of filtering material with lamp black adapted to fill up certain pores of said material and superimposing the layers of said material upon each other so as to obtain a critical pore diameter.

4. A process for building a filter comprising the steps of separately impregnating each of a plurality of layers of filtering material with zinc oxide adapted to fill up certain pores of said material and superimposing the layers of said material upon each other so as to obtain a critical pore diameter.

5. A filter comprising a plurality of layers of filtering material superimposed upon each other, each of said layers being impregnated with finely divided solid particles adapted to fill up certain pores thereof.

6. A filter comprising a plurality of layers of filtering material superimposed upon each other, each of said layers being impregnated with unequal amounts of finely divided solid particles so as to fill up certain pores thereof.

7. A filter comprising a plurality of layers of filtering material superimposed upon each other, each of said layers being impregnated with lamp black adapted to fill up certain pores thereof.

8. A filter comprising a plurality of layers of filtering material superimposed upon each other, each of said layers being impregnated with zinc oxide adapted to fill up certain pores thereof.

In testimony whereof we affix our signatures.

ROBERT L. SEBASTIAN.
LEO FINKELSTEIN.